Nov. 6, 1945.  E. RATNER  2,388,284
METHOD OF TREATING RAW ANIMAL FATS
Filed Aug. 7, 1943
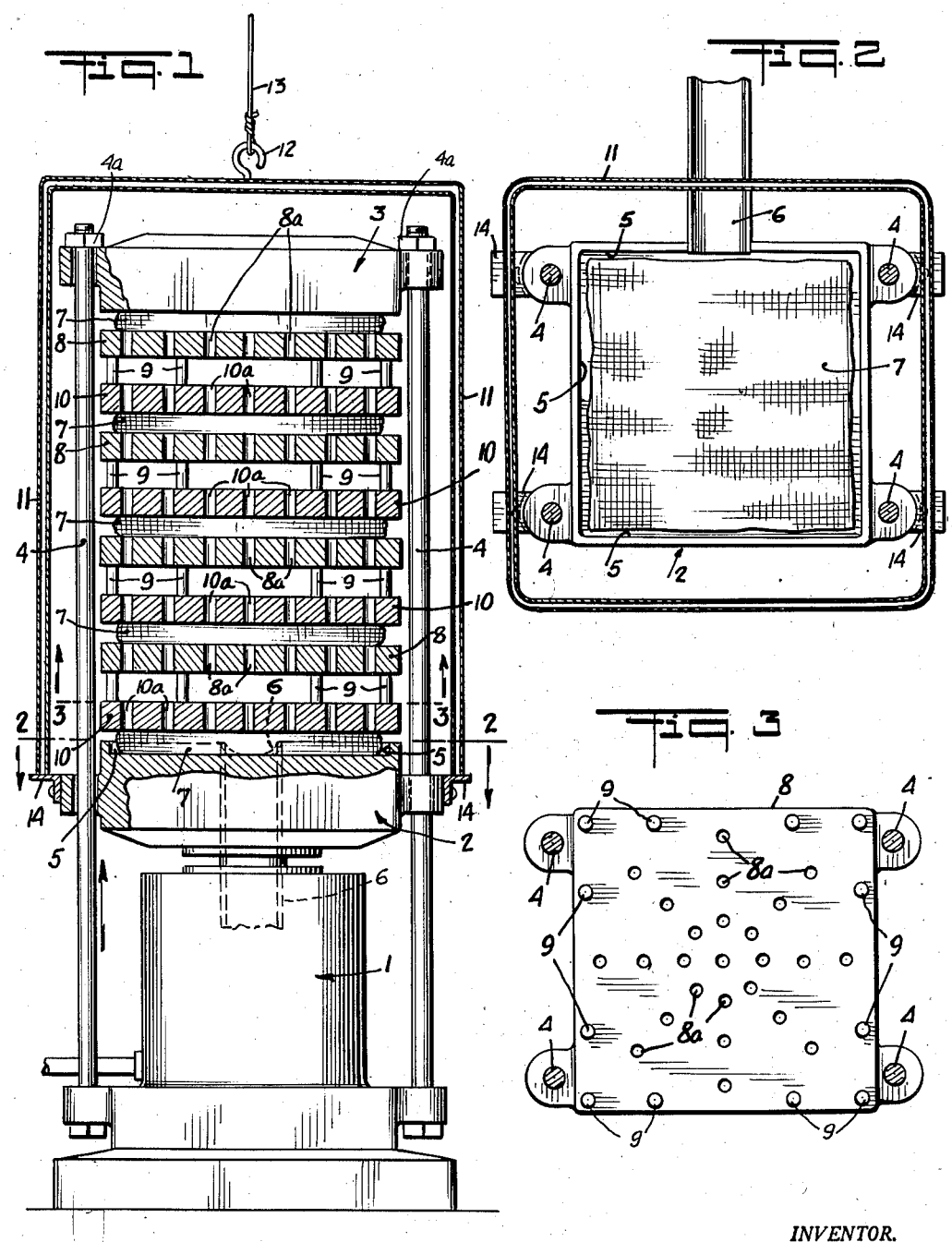
INVENTOR.
ESSEL RATNER
BY Mock & Blum
ATTORNEYS Patented Nov. 6, 1945

2,388,284

UNITED STATES PATENT OFFICE 2,388,284

METHOD OF TREATING RAW ANIMAL FATS

Essel Ratner, New York, N. Y., assignor of one-half to Boris Pregel, New York, N. Y.

Application August 7, 1943, Serial No. 497,785

7 Claims. (Cl. 260—412.6)

My invention relates to a new and improved method of treating raw animal fats. Such raw fats contain animal tissue and water. The invention relates particularly to the treatment of crude and fresh fat which is neutral in odor and taste. This crude fat may be beef suet.

One of the objects of my invention is to provide improvements in the method which is set forth in my application Serial No. 478,112, which was filed in the U. S. Patent Office on March 5, 1943, of which this application is a continuation-in-part.

Another object is to eliminate or to minimize the unpleasant taste and odor which results from heating the fat, in the process of treating beef suet or other neutral crude, fresh fat.

Other objects of my invention are stated in the annexed description and diagrammatic drawing.

Fig. 1 is a vertical elevation, partially in section, of the apparatus which I use for practicing the improved method.

Fig. 2 is a section in the line 2—2 of Fig. 1.

Fig. 3 is a section on the line 3—3 of Fig. 1.

Crude fresh animal fat is free from objectionable taste and odor. It is practically odorless and tasteless. When such crude fat is heated in order to separate its constituents, such heating produces an objectionable odor and taste. The products become more inferior, as the temperature of treatment is increased. I believe that the disagreeable odor is produced by the heating of the fibrous walls of the cells of the fibre or tissue of the crude fat. The unpleasant odor is absorbed only by molten fat, especially by the fraction of the crude fat which melts at 28° C.–32° C. This fraction is known commercially as oleo oil.

I believe that the cells of the fibrous tissue of animal fat have walls of different resistance to heat, so that some of said cells are disintegrated or opened at 36° C.–38° C., most of said cells are disintegrated or opened at 54° C.–60° C., and many of said cells are disintegrated or opened at 100° C.–110° C.

According to the known commercial treatment of crude animal fat, said crude fat is mechanically disintegrated into particles, which are heated at 55° C.–60° C. The fraction which is thus separated is considered as being of the highest quality, and it is used only for making food for human beings. Such fraction which is obtained by heating to 55° C.–60° C. has a pronounced taste and odor due to its heating to said temperature range, and said taste and odor increases with subsequent commercial processing. I wish to eliminate such taste and odor.

The second quality fraction, which is produced according to known commercial practice by heating the residue of the crude fat which remains after the first extraction, to 100° C.–110° C., is used for making soap. The fibrous residue which finally remains, is used as a cattle food.

According to my method, the particles of crude and neutral fat are simultaneously subjected to heat and pressure. Some of the cell-walls begin to open at about 20° C. As the temperature is raised above 20° C., the more resistant cell-walls begin to open. Finally, at 43° C.–47° C. the most resistant cell-walls open. These most resistant cell-walls, which do not open until the temperature is about 43° C.–47° C., comprise about 10%–15% of the total number of cells of the tissue. The largest number of cell-walls open between 20° C.–43° C. As each fraction of the crude fat is separated from said crude fat, such fraction is withdrawn from the press. Such fractions may be respectively withdrawn in molten form, and separately collected. The fractions can be intermixed, if desired.

I can thus separate the non-fibrous constituents of the crude beef suet from the fibre or tissue in six fractions, as follows:

| Fraction | Separation point of fraction from the fat | Proportion of fraction by weight |
|---|---|---|
| | °C. | Percent |
| No. 1 | 20–25 | 8–9 |
| No. 2 | 25–30 | 12–13 |
| No. 3 | 30–36 | 14–15 |
| No. 4 | 36–38 | 18–19 |
| No. 5 | 38–43 | 19–20 |
| No. 6 | 43–47 | 13–14 |

Crude or raw beef suet contains about 4%–13% weight of water, 75%–90% of fat, and 6%–12% of tissue which is rich in protein. I treat the crude beef suet in unrendered form, and while it has substantially its original moisture content.

Usually each fraction has a higher melting point than each preceding fraction. For example, Fraction 6 may have a melting point of 48°–50° C. However, it may be that the last fraction, No. 6, may have a lower melting point than No. 5, due to the accumulation of low-melting ingredients on the fibre.

Hence, I separate all the fat from the fibrous residue, at temperatures which are sufficiently low, so that each said fraction, or mixtures of said fractions, are sufficiently free from objectionable taste and odor to be used for human consumption. The fibrous residue which remains, is also sufficiently free from objectionable taste and odor, to be used for human consumption. Said residue is meat, which can be ground and used in making sausage, etc.

During the combined heating and pressure, the temperature of the fat in the press is less than the temperature of the atmosphere in which the press is located, because the ground fat, in the form of cakes, is wrapped in filter cloth, which is a good heat insulator. Hence, the temperature of each fraction rises, as it is withdrawn from the cake. However, each fraction is quickly withdrawn from the heated atmosphere, so that the rise in temperature is negligible, and such rise in temperature does not affect the taste or odor of the fibre-free fraction.

Each fraction or mixtures of fractions can be treated according to known methods after it has been withdrawn from the press.

According to my invention, it is not necessary to use the long and expensive commercial method, for separating the oleo oil, which melts at 28° C.–32° C., from the oleo-stearin, which melts at 46° C.–50° C.

I can use only moderate pressure, not more than 1500 lbs. per inch. I can use pressures as low as 400 lbs.–500 lbs. per inch and even less. I prefer to use minimum pressures, in order fractionally to separate the non-fibrous constituents of the fat from its fibre and water.

The apparatus comprises a hydraulic cylinder 1, whose piston has a head 2 fixed thereto. Said head 2 is moved upwardly, in order to exert the pressure. The apparatus has a top 3, which can be fixed to the vertical rods 4. As shown in Fig. 2, lower head 2 is provided with a collecting depression or recess 5, and said collecting recess 5 has an outlet pipe or trough 6. The cakes of fat, wrapped respectively in filter cloths, are designated by the reference numeral 7. Each cake of fat is wholly enclosed in its respective wrapping. The discs 8 have bores 8a, and feet 9. The discs 10 have top and bottom planar faces, and bores 10a.

The bottom head 2 has perforated guide-lugs, which fit closely and slidably upon the vertical rods 4. The upper head 3 has similar guide-lugs. Upper head 3 can be slidable on rods 4, or it can be fixed and held stationary in the top position which is shown in Fig. 1. The top ends of rods 4 are provided with stop-nuts 4a.

A casing 11 is supported in the top wall of brackets 14, which are fixed to head 2. Said casing 11 can be heated by any suitable conventional means (not shown), in order to heat the atmosphere within said casing 11 to the respective desired temperature, so that the wrapped cakes of fat are heated to the respective desired temperature. The wall of casing 11 can be heated electrically, with a suitable adjustable thermostatic control. Said casing 11 is moved in unison with head 2, and said casing 11 surrounds the wrapped cakes 7, the discs 8 and 10, and the upper head 3. The bottom wrapped cake 7 is located partially in the recess 5 of bottom head 2.

I can use any heating system for heating the atmosphere within the casing 11. Said atmosphere is under normal pressure, because the bottom of casing 11 is open.

The top wall of casing 11 has a hook 12, to which a lifting cable 13 is fixed. The casing 11 can thus be removed from head 2.

As each fraction is separated from the wrapped cakes of fat, each said fraction flows in liquid form through the respective wrappings of filter cloth, into a respective collecting vessel.

It is easy to calibrate the apparatus, in order to determine when the cakes of fat are heated to the respective desired temperature, which will be less than the respective temperature of the atmosphere in casing 11.

As above stated, I prefer to heat the wrapped cakes in six successive temperature ranges, in order to separate six respective fractions, although the invention is not limited to any particular number of temperature ranges or fractions. Likewise, I prefer not to heat the wrapped cakes of fat above about 47° C. The fat is ground in the usual manner, in order to make the cakes of fat which are wrapped in the filter cloths.

When the liquid fraction flows out of any wrapped cake 7 which is located above the top wall of head 2, said fraction flows downwardly through the bores 8a of the respective lower disc 8, and each fraction is collected in the depression 5, to flow out of the press through trough 6. As above stated, the drawing is not to scale. The rectangular cakes of fat 7 may be smaller than as shown in the drawing, in order to provide ample space at each side of the bottom cake 7, for collecting all of each fraction in recess 5. Each cake 7 is subjected to pressure between upper and lower perforated planar walls. The number and size and location of the bores 8a and 10a can be varied as desired.

After the treatment, the residue consists substantially of fibre and water. Said fibre can be used for human consumption as a valuable source of protein.

Whenever I state a temperature or a temperature range, the invention is not limited to the precise figure or figures, as there can be a reasonable variation.

Each fraction of the fat, in adding to the fibre, can be used for human consumption.

Following the example previously given, if crude and odorless and tasteless raw beef suet is being treated, said suet is treated in the first stage while said fat is at a temperature between 20° C.–28° C. Pressure is applied until about 8%–9% by weight of the fat has been collected as the first fraction.

The necessary pressure is applied immediately after the raw beef suet is thus brought to a temperature of 20° C.–25° C. The pressure must be applied and kept constant, while the fat is thus maintained at a temperature of 20° C.–25° C., until the first fraction has been separated. When I specify a temperature range, I prefer to operate at or near the lower limit of the respective temperature range. The pressure may be increased or decreased, or kept constant, in the treatment in each stage.

After the first fraction has been thus removed, the temperature of the air is increased until the temperature of the fat is in the second temperature stage, namely, 25° C.–30° C. The pressure can be maintained while the temperature is thus increased to that of the second stage. The pressure can be maintained constant during each of the temperature stages, or it may be increased, especially in the last and highest temperature stage. On the average, the pressure is constantly applied and it is equal, while the heat is applied in all the temperature stages, save that the pressure is increased while the temperature is raised to that of the last stage. Hence, I depend primarily on difference of temperature, and not on difference of pressure, to fractionate the non-aqueous and non-fibrous constituents of the crude fat. However, the invention is not limited to this feature, because the pressure may be varied.

There is little or no loss of heated air from the apparatus because casing 11 is open, only at the bottom. The bottom of casing 11 can be wholly or partially enclosed, if desired, so that the atmosphere in casing 11 can be wholly enclosed.

If the lowest temperature range of 20° C.–25° C. is below the atmospheric temperature, the cakes can be chilled prior to packing them into the press, so that the cakes are within said lowest temperature range during the first pressing. The air in casing 11 is the medium for heating the cakes of crude fat and the press. The temperature of the air may be a few degrees higher than the temperature of the fat, during each pressing step, that is, during step No. 2, for example, the temperature of the fat is from 25° C.–30° C., and the temperature of the heated air is a few degrees higher than the temperature of the fat.

The percentage proportion of each fraction may vary, depending upon the raw material. However, in each case, there is a maximum proportion which can be expressed at the respective temperature range.

I claim:

1. In the art of treating a mass of comminuted crude raw beef suet, said mass containing natural moisture and fibre, that step which consists in applying pressure to said mass while said mass is in cake form, said pressure being applied to said mass at a temperature of substantially 20° C.–25° C. to express a fraction whose weight is at least substantially 8% of the weight of said mass, said fraction being expressed while substantially retaining the moisture and fibre of said mass in the residue of said mass.

2. In the art of treating a mass of comminuted crude raw beef suet, said mass containing natural moisture and fibre, those steps which consist in applying pressure to said mass while said mass is in cake form, said pressure being applied to said mass at a temperature of substantially 20° C.–25° C. to express a first fraction whose weight is at least substantially 8% of the weight of said mass, then expressing a second fraction from the residue of said mass at a temperature of substantially 25° C.–30° C., the weight of said second fraction being at least substantially 12% of the weight of said mass, said second fraction being expressed while said residue is in cake form, said fractions being expressed while substantially retaining said moisture and fibre in the residue of said mass.

3. A method of treating a mass of comminuted raw beef suet which contains natural moisture and fibre, which consists in applying heat and pressure to said beef suet in a plurality of stages, said heat and pressure being thus applied while said beef suet is in cake form, a respective fraction being expressed from said mass in each stage, the respective fractions being thus expressed at successively higher temperature, the highest temperature being substantially 47° C., said fractions being expressed while retaining substantially all said moisture and fibre in the final residue of said mass.

4. A method according to claim 3 in which substantially 71%–86% of the weight of said mass is expressed therefrom at a maximum temperature of substantially 43° C.

5. A method according to claim 4 in which the oleo-oil is substantially extracted from said mass, before the temperature of said beef suet is raised substantially above the melting point of said oleo-oil.

6. A method of treating a mass of comminuted raw beef suet which contains natural moisture, which consists in applying heat and pressure to said beef suet in five stages to express five fractions therefrom, said heat and pressure being applied to said beef suet while it is in cake form, said five stages being successive, the respective successive temperatures in said five stages being substantially 20° C.–25° C., 25° C.–30° C., 30° C.–36° C., 36° C.–38° C., 38° C.–43° C., the weights of the respective fractions being substantially 8%–9%, 12%–13%, 14%–15%, 18%–19%, 19%–20%, said percentages being based upon the original weight of said mass, said natural moisture and the fibre of said beef suet being substantially wholly retained in the residue of said mass.

7. A method of treating a mass of comminuted raw beef suet which has natural moisture and fibre, in order to separate the oleo-oil from said mass while leaving substantially all said moisture and fibre in the residue of said mass, which consists in applying heat and pressure to said mass while it is in cake form, said mass being heated to a temperature which is substantially equal to the melting point of said oleo-oil, said pressure being sufficient to express substantially all the oleo-oil, said temperature and pressure being sufficiently low to retain substantially all said moisture and fibre in the residue of said mass which remains after the separation of the oleo-oil.

ESSEL RATNER.